C. A. PARSONS, A. Q. CARNEGIE, AND M. BONE.
MANUFACTURE OF BLADING FOR TURBINES.
APPLICATION FILED FEB. 15, 1922.
1,420,338.
Patented June 20, 1922.
11 SHEETS—SHEET 1.
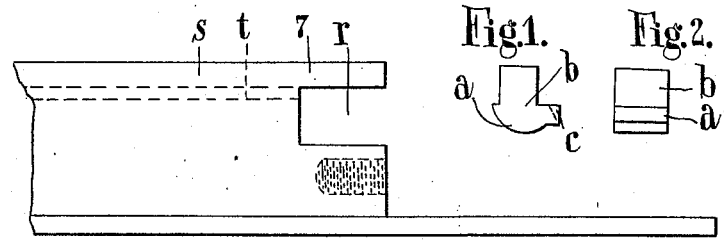
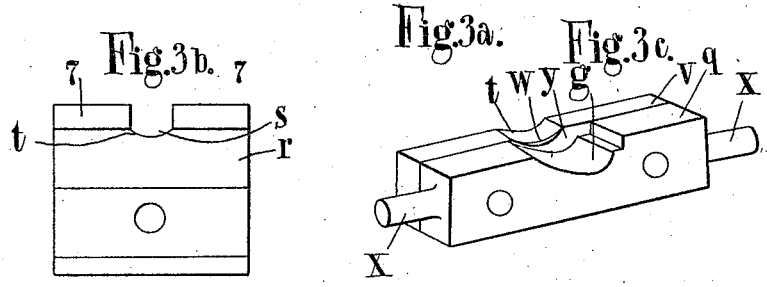
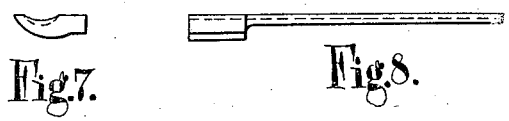
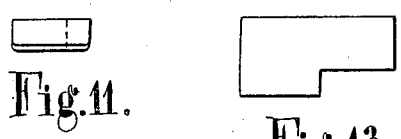
INVENTORS:
CHARLES A. PARSONS,
ALFRED Q. CARNEGIE,
MATTHEW BONE.
by Spear, Middleton, Donaldson & Hall.
Attys.

C. A. PARSONS, A. Q. CARNEGIE, AND M. BONE.
MANUFACTURE OF BLADING FOR TURBINES.
APPLICATION FILED FEB. 15, 1922.

1,420,338.

Patented June 20, 1922.
11 SHEETS—SHEET 2.

INVENTORS:
CHARLES A. PARSONS,
ALFRED Q. CARNEGIE,
MATTHEW BONE
by Spear, Middleton, Donaldson & Hall.
Attys.

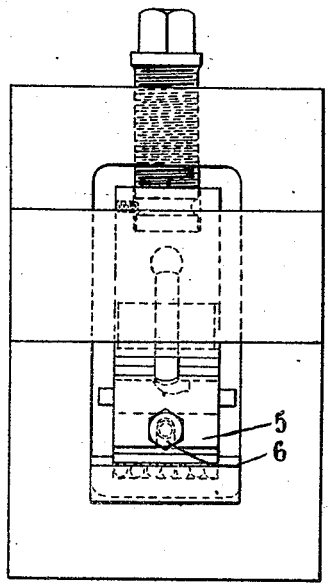
Fig.5.
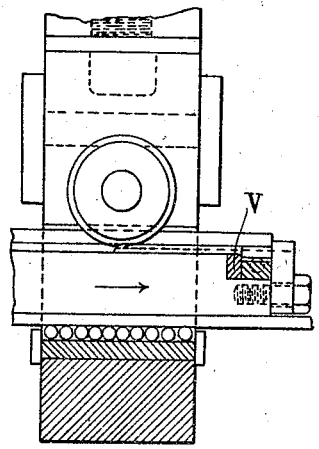
Fig.6.
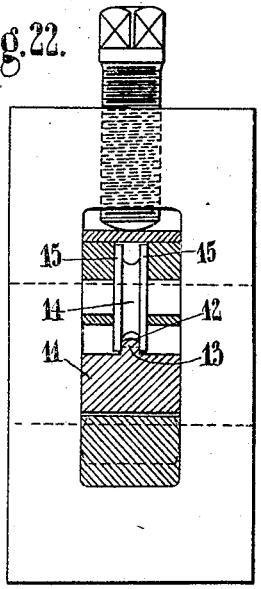
Fig.22.
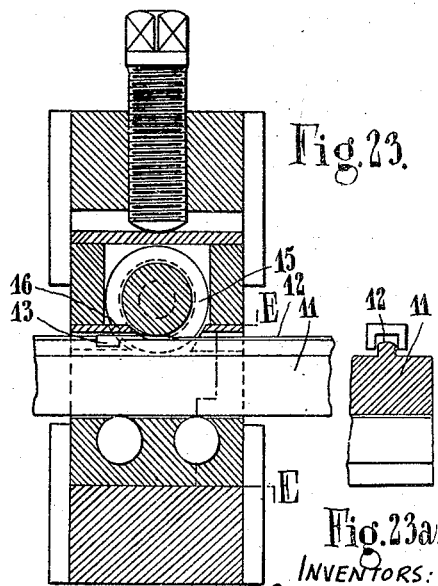
Fig.23.
Fig.23a.
INVENTORS:
CHARLES A. PARSONS,
ALFRED Q. CARNEGIE,
MATTHEW BONE.
By Spear, Middleton, Donaldson & Hall
Attys.

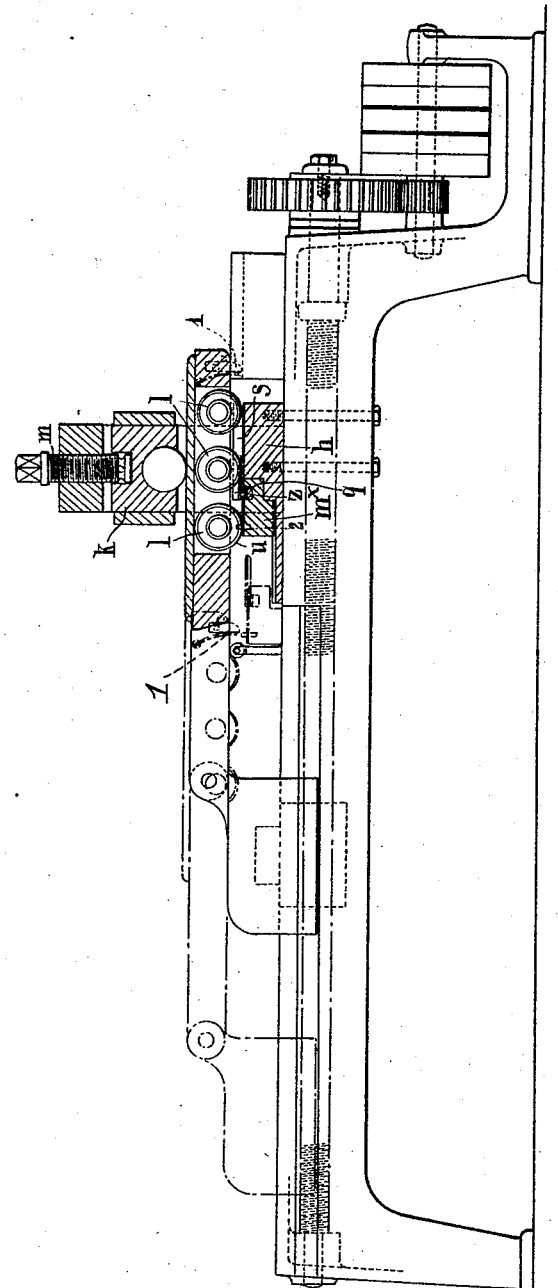

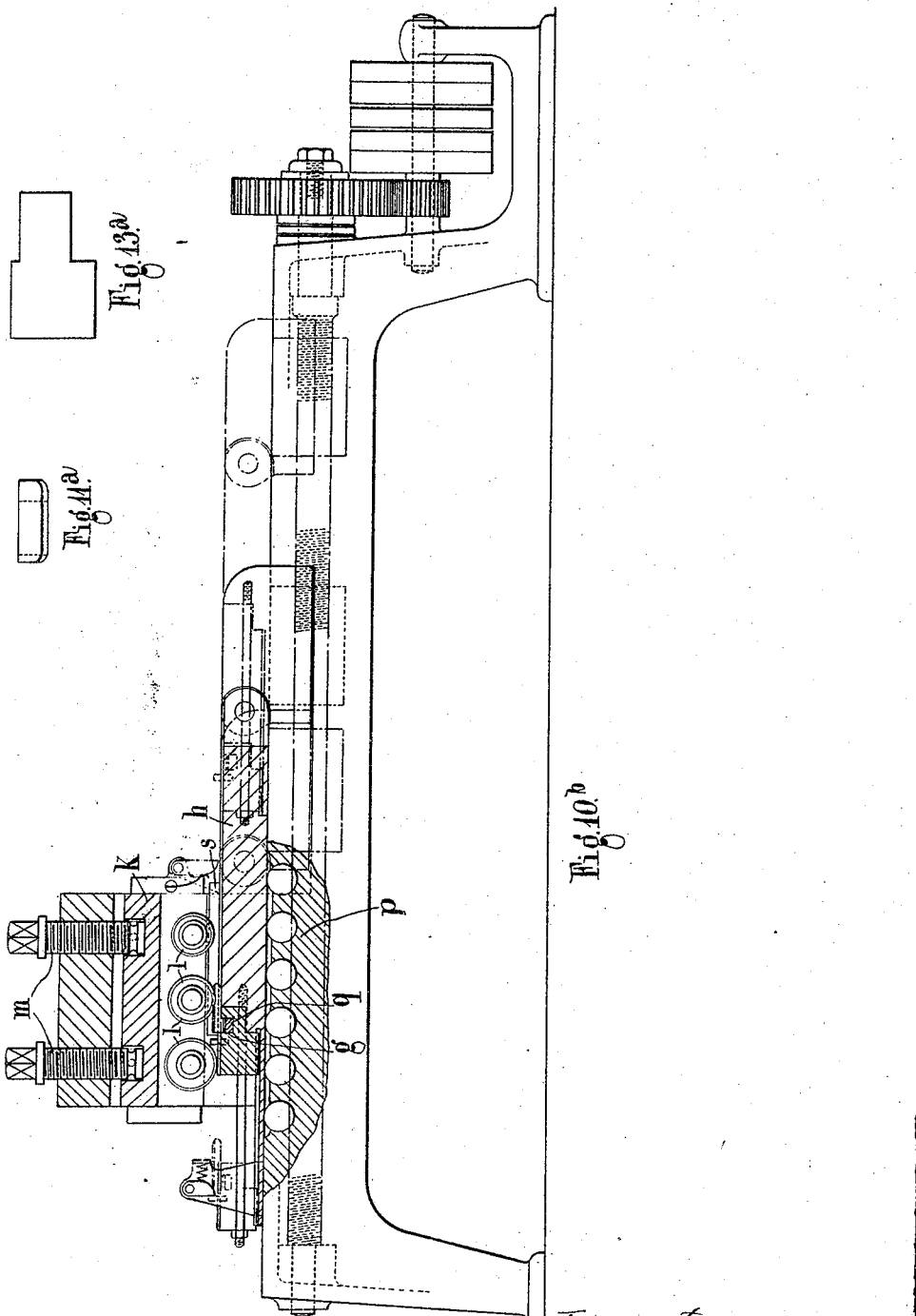

C. A. PARSONS, A. Q. CARNEGIE, AND M. BONE.
MANUFACTURE OF BLADING FOR TURBINES.
APPLICATION FILED FEB 15, 1922.
1,420,338.
Patented June 20, 1922.
11 SHEETS—SHEET 6.
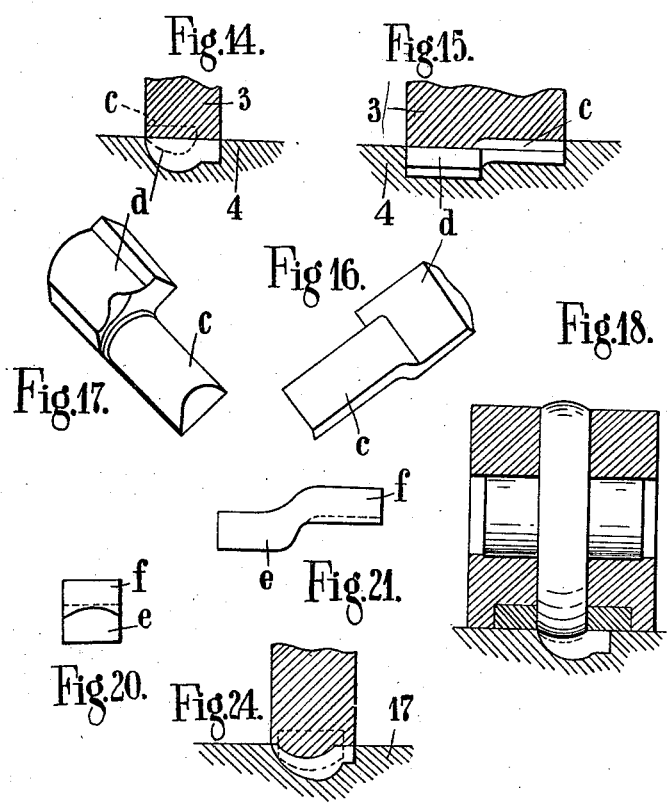
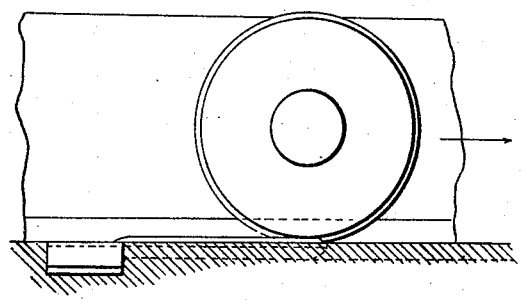
Fig.19.
INVENTORS:
CHARLES A. PARSONS,
ALFRED Q. CARNEGIE,
MATTHEW BONE.
by Spear, Middleton, Donaldson & Hall.
Attys.

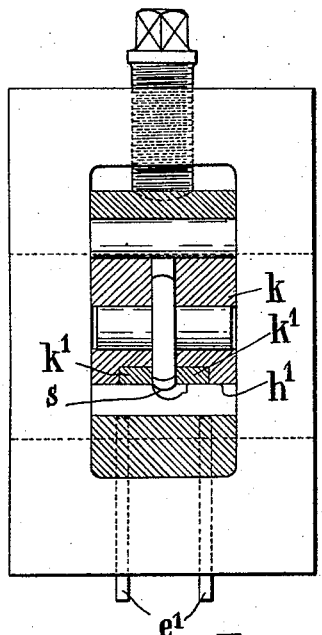
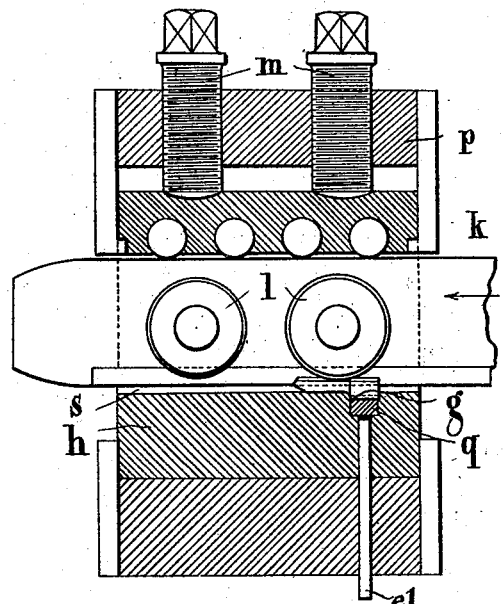
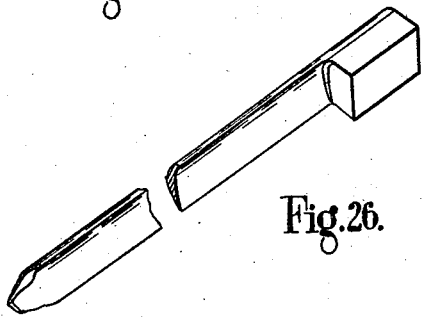

C. A. PARSONS, A. Q. CARNEGIE, AND M. BONE.
MANUFACTURE OF BLADING FOR TURBINES.
APPLICATION FILED FEB. 15, 1922.
1,420,338. Patented June 20, 1922.
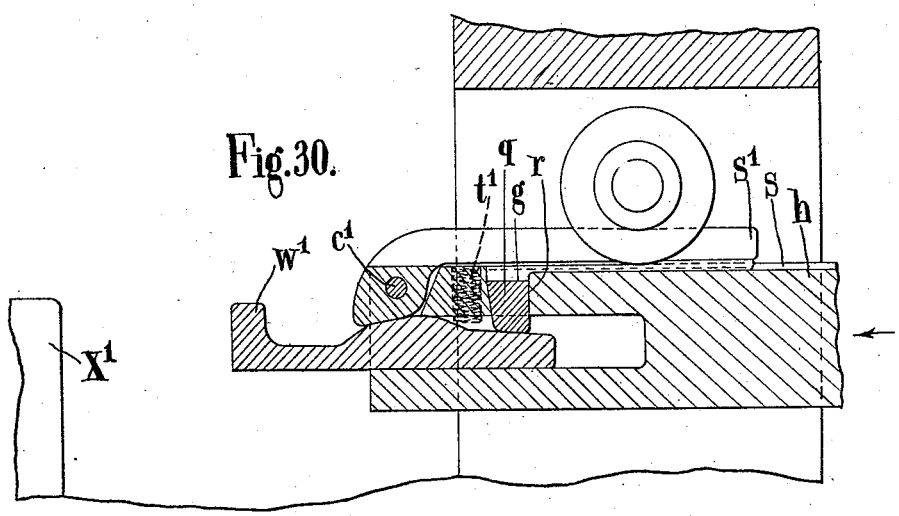
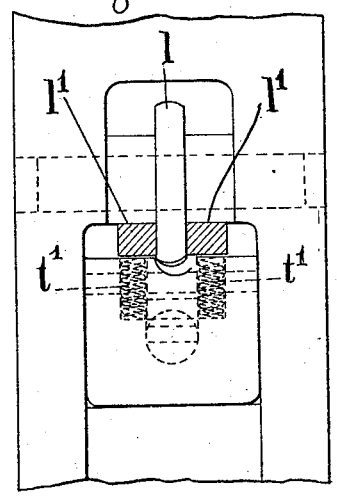
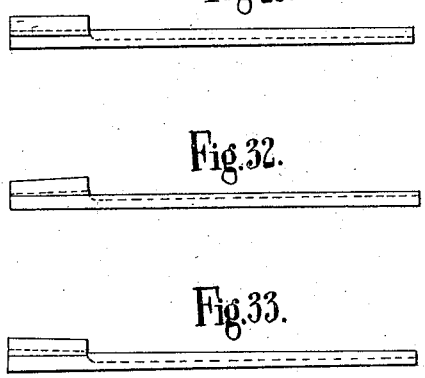
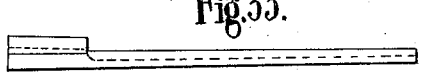
INVENTORS:
CHARLES A. PARSONS,
ALFRED Q. CARNEGIE,
MATTHEW BONE.
By Spear, Middleton, Donaldson & Hall.
Attys.

C. A. PARSONS, A. Q. CARNEGIE, AND M. BONE.
MANUFACTURE OF BLADING FOR TURBINES.
APPLICATION FILED FEB. 15, 1922.

1,420,338.

Patented June 20, 1922.

INVENTORS:
CHARLES A. PARSONS.
ALFRED Q. CARNEGIE.
MATTHEW BONE.

by Spear, Middleton, Donaldson & Hall
Attys.

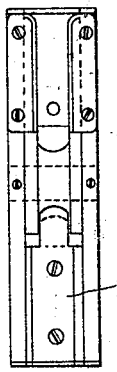
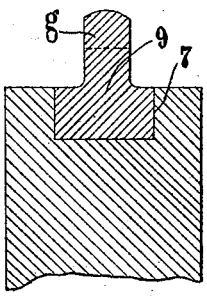
Fig. 36.  Fig. 39.
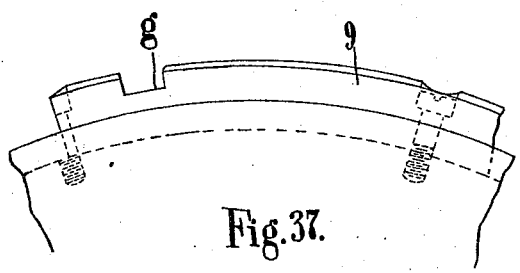
Fig. 37.
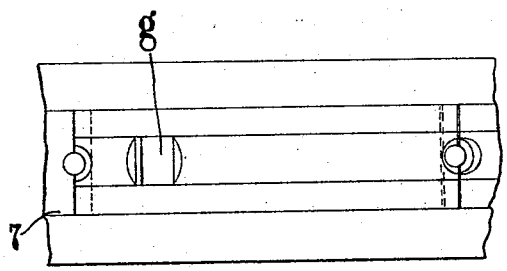
Fig. 38.

UNITED STATES PATENT OFFICE.

CHARLES ALGERNON PARSONS, ALFRED QUINTIN CARNEGIE, AND MATTHEW BONE, OF NEWCASTLE-UPON-TYNE, ENGLAND; SAID CARNEGIE AND SAID BONE ASSIGNORS TO SAID PARSONS.

MANUFACTURE OF BLADING FOR TURBINES.

1,420,338.  Specification of Letters Patent.  Patented June 20, 1922.

Original application filed June 7, 1921, Serial No. 475,789. Divided and this application filed February 15, 1922. Serial No. 536,811.

*To all whom it may concern:*

Be it known that we, CHARLES ALGERNON PARSONS, ALFRED QUINTIN CARNEGIE, and MATTHEW BONE, all subjects of the King of Great Britain and Ireland, and all residing at Heaton Works, Newcastle-upon-Tyne, in the county of Northumberland, England, have invented certain new and useful Improvements in the Manufacture of Blading for Turbines, of which the following is a specification.

The present invention relates to the manufacture of turbine blades of the type in which the blade is formed integral with its base or spacing piece.

In the usual method of manufacturing turbine blading, the blade strips are drawn or rolled in long lengths, from which blades of suitable length can be cut, the spacing or packing pieces being also manufactured in long lengths and cut off as required to lengths corresponding to the depth of the groove in the turbine drum, or other suitable dimension. Such blades are fixed by caulking, riveting or other suitable means.

In British Patent Specification No. 16910 of 1918 a method of manufacturing turbine blades integral with their bases is described, the blade being extruded from the die so as to form the base and the blade itself in one piece. We have found, however, that while sound blades satisfactory in form can be produced in this manner, the method is limited to the use of certain metals or mixtures of metals which possess characteristics rendering them suitable for extrusion. Such metals and alloys, however, in some cases are found to have critical temperatures at which their strength is impaired, and these temperatures are frequently within the limits of the ordinary temperatures met with in steam turbines.

It has not so far been found commercially practicable to obtain satisfactory blades by the extrusion process where steel, manganese copper, 70—30 brass, or Monel metal are employed, although excellent blades may be produced from these metals by rolling or drawing.

The invention consists in the means for manufacturing turbine blades integral with their bases hereinafter described and particularly pointed out in the claims.

Referring to the accompanying drawings:—

Figures 1 and 2 are two views at right angles of a blank before rolling.

Figures 3, 4, 5 and 6 show diagrammatically one form of rolling operation in which the roll is stationary and the blade is carried in a blade-forming tool or bar which is adapted to be reciprocated by suitable mechanical means.

Figure 3:
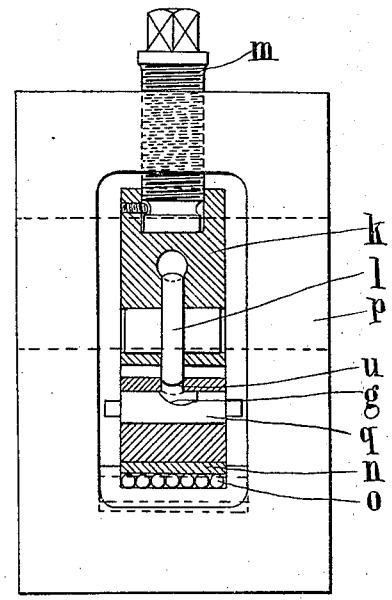

Figure 3$^a$ shows a side elevation, and

Figure 3$^b$ shows an end elevation of the blade-forming bar.

Figure 3$^c$ shows a perspective drawing of the insert piece which forms the pocket space in the blade-forming bar.

Figures 7 and 8 show views of the blade after the rolling operation.

Figure 8$^a$ shows diagrammatically the progressive stages in the rolling of a blade.

Figures 9, 10:
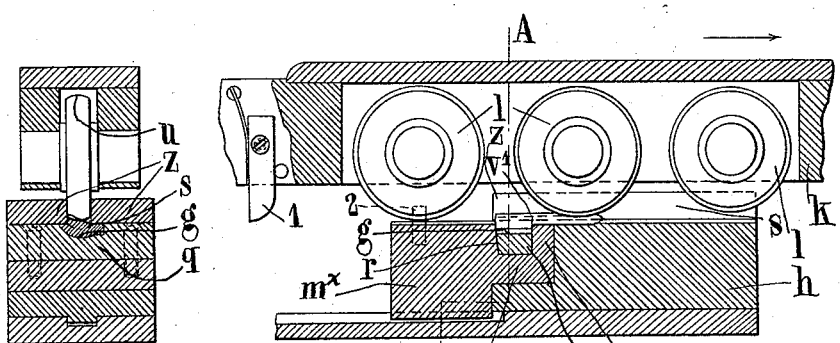

Figures 9 and 10 are two sections at right angles (Figure 9 being a cross-section on the line A—A of Figure 10) showing alternative means for carrying out the rolling operation in which the blade is carried in a fixed blade-forming tool or bar, and the roll or rolls are mounted in a moving member adapted to be reciprocated by suitable mechanical means.

Fig. 10$^a$ shows diagrammatically a machine for carrying out the rolling operation illustrated in Figs. 9 and 10 in which the blade is carried in a fixed blade-forming tool or bar, the roll or rolls being mounted in a moving member adapted to be reciprocated by screw gearing and reversible belt pulleys, or other suitable means.

Fig. 10ᵇ shows diagrammatically a machine for carrying out the rolling operation in which the blade is carried in a movable blade-forming tool or bar, the roll or rolls being mounted in a frame, adjustable for height, in a fixed pinch frame secured to the bed of the machine. The blade-forming bar is adapted to be reciprocated (between the roll carrying frame and a series of antifriction rollers carried by the base of the machine) by screw gearing and reversible belt pulleys, or other suitable means.

Figures 11, 12 and 13 show a form of blank which is adapted to be punched out of sheet metal.

Figs. 11ᵃ and 13ᵃ are views of a modified form of blank.

Figures 14 and 15 show the process of upsetting the type of blank illustrated in Figures 11, 11ᵃ, 12 and 13 13ᵃ.

Figures 16 and 17 show perspective views of the blanks after the upsetting process.

Figures 18 and 19 show a form of apparatus suitable for rolling the upset blank illustrated in Figures 11 to 17.

Figures 20 and 21 show another form of blank suitable for forming blades.

Figures 22, 23 and 23ᵃ (the latter a cross-section on the line E—E of Figure 23) show diagrammatically apparatus for rolling this type of blank.

Figure 24 shows a die suitable for pressing the back portion of the base to the correct form.

Figure 25 shows a finished blade of this type.

Figure 26 shows a perspective view of a blade rolled from the blank illustrated in Figures 20 and 21.

Figure 27 shows a section through a similar blade in which tapered reinforcement has been produced by the removal of metal from suitable parts of the blade-forming bar or segment.

Figures 28 and 29 show diagrammatically a modified form of apparatus for rolling blade blanks of the type illustrated in Figures 11, 11ᵃ, 12 and 13 13ᵃ, in which the rolls are mounted in a reciprocating bar, the working face of which is provided with hardened faces for the purpose of preventing canting of the blank and stanching leakage of metal during rolling; these figures also show suitable means for applying pressure during rolling and means for extracting the blade after the rolling operation.

Figures 30 and 31 show a means of locking the blade blank during rolling.

Figure 32 shows a finished blade with the base pressed to a slightly tapered form suitable for mounting in a turbine shaft.

Figure 33 shows a finished blade with the base pressed to a slightly tapered form suitable for mounting in a turbine cylinder.

Figures 34, 35, 36, 37, 38 and 39 show diagrammatically an alternative form of apparatus for rolling blade blanks of the types illustrated in Figures 20 and 21 by a continuous process.

In carrying the invention into effect, various methods of obtaining a blank suitable for the rolling or drawing stage of the process may be employed; for example, according to one method, Figures 1 and 2, we may roll, extrude, draw or otherwise form a long length of bar of such cross section that one part of it $a$ is of the approximate shape of the base portion, while the other part $b$ of the cross section forms a projection from the base of substantially rectangular form, this portion of the metal serving eventually to form the blade proper. The base portion may have additional metal $c$ in order to facilitate insertion and removal of the piece from the pocket of the forming bar in which it is rolled. The bar formed to this cross section is cut to suitable lengths, as in Figure 2, for example, corresponding to the depth of the groove in the turbine drum into which the finished blade is to be inserted, and the blanks so formed are then subjected to the blade-forming process hereinafter described. A blade manufactured from a blank of this type will naturally have the desirable characteristic that the grain of the metal will run in the direction of the length of the blade.

According to a second example the blanks may be obtained by punching (preferably so that the direction of the grain lies along the length of the blade portion) from sheet metal of suitable thickness. The blanks so formed, which may be of any desired shape, for example as shown at Figures 11, 11ᵃ, 12 and 13 13ᵃ, may be upset in a die as shown at Figures 14 and 15 to produce a portion $c$ which is adapted to be rolled or drawn to form the blade and a portion $d$ which will eventually be the base of the blade and which is held during the subsequent operation in one member of the blade-forming machine, the upsetting operation being so effected as to give the blank approximately the final form of the base, and to displace the metal which is to form the blade to a position suitable for the subsequent rolling operation and at the same time to give the blade portion more or less its final form on one side.

Figures 16 and 17 are drawn in perspective and will give a clear idea of the form of the upset blank.

According to a third example the blank may be formed by cutting short lengths, as shown at Figures 20 and 21, from a bar formed by rolling, drawing or the like, the section of which is approximately rectangular and of dimensions approximately equal to the section of the combined blade and base. In this method the base portion *e* of the blank before rolling and during the rolling process is intended to be placed symmetrically relatively to the blade portion *f* and to project on its concave side. This form is obtained by upsetting the piece of rectangular bar to a cranked form (see Figure 2†) in which the base portion remains rectangular instead of approximating to its final form, the final form of the base being obtained in a further operation or series of operations subsequent to the formation of the blade.

According to a fourth example, a bar may be rolled in stepped or toothed rolls to an approximately rectangular cross section but cranked in alternate directions along its length, so that blanks having a cranked or upset shape may be cut from it.

It will be understood that blanks having forms suitable for treatment under this process can be made in many different ways and the methods above described are only intended to make the process clear. We do not limit the scope of this invention to the forms of blank actually described.

Although we have specially mentioned the use of rolled sheets or rolled or drawn bars for making the blanks from which blades are to be manufactured, in some cases, where the nature of the metal will permit, and where the blank is of such dimensions that the subsequent rolling and base-forming operations will give the metal all the working which is necessary to put it into a condition suitable for use in turbine blading, we may make our blanks from individual castings or from cast bars of suitable cross sections made in chills or other suitable moulds, and cut off to suitable lengths, or from drop forgings.

After the formation of the blanks by one or other of the methods above described, the rolling or drawing process may be carried out in various ways depending on the type of blank, and we will now describe some methods, by way of example, by which successful results have been produced.

Figure 4:
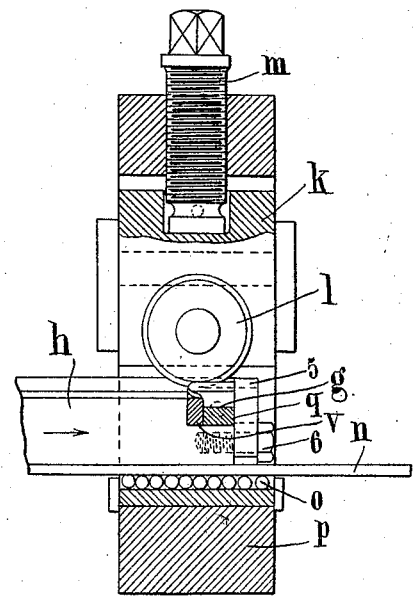

According to one example in which blanks as shown in Figures 1 and 2 are used, the blank of length approximately equal to the depth of the groove into which it is to be fitted in the turbine, and of the form illustrated, is placed in a suitable pocket space *g* in a forming bar *h* (see Figures 3 and 4) constituting one member of a rolling machine, the other member *k* of which carries a convex roll *l*, which can be pressed towards the forming bar *h* by means of the pinching screw *m*. The forming bar is provided with a separate hardened steel bottom face *n* Figs. 3 and 4 which bears against ball or other anti-friction rolling supports *o* situated in the base of the rolling machine frame *p*. The pocket space in which the blade base lies is made in the form of an insert piece *q* which fits into a transverse slot *r* cut in the end of the bar and shown in Figures 3ª and 3ᵇ. The bar is provided with a longitudinal parallel sided groove *s* in its upper face, the bottom *t* of the groove being of a concave section and corresponding in shape with the convex side of the blade which it is desired to produce. The roll *l* has a working face *u* of convex form corresponding with the concave side of the blade required and it operates and closely fits in the longitudinal groove *s*. The pocket space is formed in the top of the insert piece *q* and its shape is made suitable for forming the desired blade base.

When the insert piece *q* is placed in position in the transverse slot *r* in the end of the bar (Figures 3ª and 3ᵇ) the two projecting pieces 7 will bear on the lateral projections on the base portion of the blank and will retain the blank in its correct position and prevent it from canting under the action of the roll. The projecting pieces 7 will also complete the space into which the metal has to be pressed to form the desired shape of blade base.

In order to facilitate the removal of the rolled blade, the insert piece *q* containing the pocket space has attached to it another piece *v* which registers with and forms a continuation of the concave bottom *t* of the longitudinal groove *s* in the blade-forming bar *h*. The end of the concave-bottomed groove *w* in the piece *v* is radiused so as to produce a suitable radius at the point where the blade emerges from its base portion, thereby adding very considerably to the strength of the blade. The insert piece *q* is provided with trunnion pieces *x* adapted to be engaged by a suitable withdrawing lever (not shown) which enables sufficient force to be applied to the insert piece to allow the rolled blade to be withdrawn from the longitudinal groove *s*. The withdrawal of the blade is accomplished by the inner face *y* of the secondary insert piece *v* bearing against the blade base.

The rolling of the blade is shown in successive stages at Figures 3 and 4 and 5 and 6, and the blade at the end of the rolling operations at Figures 7 and 8. Figure 8ª shows clearly the shape assumed by the blade at the various stages of rolling, the original blank being shown by full lines *b* and the intermediate and final shapes by the dotted lines.

We have found that when rolling blades in the machine illustrated in Figures 3, 4, 5 and 6 from blanks of the types shown in Figures 1 and 2, there is a tendency for the blade to flow backwards under the kneading action of the roll and so produce a certain length of blade in the form of a tail. Such excess or tail blade entails considerable waste of material and at the same time reduces the length of useful blade which can be produced from a given weight of blank. In order to prevent this undesirable backward formation, we provide the front of the pocket in the forming bar $h$ with a slotted stop plate 5 which is held friction-tight against the end of the bar by the bolt 6 so that the action of the roll causes this plate to descend, always keeping level with the top of the front edge of the blank and thus preventing the metal from flowing in the wrong direction.

It will be understood that the bottom of the pocket in the forming bar may be made of such shape that the back of the formed base fits against the front of the blade which is to be placed next to it. The series of blades can then be placed in a groove in a suitable jig and the necessary machining, which will be very little, may be done on a number of blades at a single operation.

Figures 9 and 10 show an alternative form of rolling machine suitable for rolling blades from blanks of the type shown in Figures 1 and 2, and also blanks of the type illustrated by Figures 11, $11^a$, 12, 13 $13^a$, 14, 15, 16 and 17. In this alternative machine the blade-forming bar is stationary, and the roll or rolls are mounted in a frame which is given a reciprocating movement by any suitable mechanism as in Fig. $10^a$. The frame carrying the rolls is arranged in a pinch frame so as to press the rolls down into the longitudinal groove $s$ in the blade-forming bar. The forming bar illustrated at Figures 9 and 10 is in two portions, one of which $m^x$, referred to as the movable portion, is slidable in the horizontal direction relatively to the other. The rolling is effected in a longitudinal groove $s$ in the forming bar having parallel sides and with its bottom of concave shape corresponding with the convex side of the blade required. This groove extends along the whole length of the fixed portion $h$ of the bar but the concave bottom of the groove is continued to the end of the movable portion $m^x$. The movable portion $m^x$ is formed with a projection $p$ inserted into the fixed portion below the two jaws $zz$ which form extensions of the parallel sides of the groove $s$. The pocket space in the movable portion of the forming bar is preferably made with closed ends, the front end and rear walls of the pocket being approximately parallel and closely fitting the ends of the blank; one end $v$ of the pocket forms the track on which the first part of the rolling is done and the edge of the wall at this end may be designed so as to produce the desired radius $v'$ between the base and the blade. The pocket space may conveniently be machined in a separate insert piece $q$ which is dropped into a suitable cross groove $r$ in the movable portion of the forming bar, and means may be provided (not shown) for raising this insert piece in order to facilitate removal of the blade after the rolling operations.

The bottom of the pocket space is designed so as to form the desired shape of the back of the base of the finished blade. The rolls $l$ have working faces $u$ of convex form corresponding with the concave side of the blade required, and operate in the longitudinal groove in the forming bar. A suitable number, for example, three, of these rolls of width to fit the groove are carried in the frame $k$ and are caused to pass along the groove to effect the rolling operations, the direction of the rolling being that in which the movable portion of the forming bar is pushed home into the fixed portion. The forces exerted by the rolls cause the two parts of the bar to be firmly held together during the rolling operations.

Any suitable framework may be employed to carry the rolls and any suitable device employed for exerting the desired pressure. Further, the frame carrying the rolls may be traversed along the forming bar as illustrated in Fig. $10^a$, or the bar traversed beneath the rolls as illustrated in Fig. $10^b$ as may be most convenient.

It will be understood that various arrangements and constructions of blade forming parts may be used without departing from the invention.

The roll carrying frame shown in Figures 9, 10 and $10^a$ is arranged for a reciprocating movement so that on the forward stroke the rolling of the blade is effected and on the return stroke suitable triggers 1 are provided which engage with projections 2 on the movable portion $m^x$ of the bar, so as to withdraw it with the finished or partially finished blade into a position convenient for ejection.

It has already been pointed out that when rolling blades from blanks having lateral projections on the base extending on one or both sides of the pocket, suitable jaws or other retaining means must be provided to prevent canting of the blank, and it will be understood that there are many ways in which this object can be achieved; also that such retaining means may readily be arranged so that they may be automatically removed to permit the insertion and removal of the blade being manufactured.

As an example, the rolls themselves may be utilized for holding or pressing the retaining means down to their work, special flanges or other tracks being provided on the rolls for this purpose. Figures 30 and 31 show as an example one construction suitable for this purpose. The blade-forming bar $h$ is provided with a pocket space formed in an insert $q$ arranged in a transverse slot $r$ cut in the bar. The groove $s$ in the bar which forms the convex side of the blade, consists only of a concave trough without any parallel side walls, the latter being provided in the form of a hinged portion $s'$ pivoted at $c'$ and arranged to be operated automatically by the action of the wedge piece $w'$. The upper faces of the hinged retaining means $s'$ are arranged so as to be pressed upon by special tracks $l'$ formed on each side of the roll $l$. When the bar, carrying the blade blank being operated upon, has passed beneath the roll the wedge $w'$ will come into contact with the stop $x'$ and will be pressed into the bar, thus allowing the springs $t'$ to raise the hinged retaining means, and at the same time ejecting the blade blank by the lifting action given to the insert $q$ by the forward end of the wedge $w'$. During the return stroke, which takes place after the new blank has been placed in position, the roll $l$ is raised by any suitable means, (not shown). The wedge $w'$ is pulled out by any suitable means (not shown) and causes the locking means $s'$ to return to its original position and thus enables the bar to pass below the raised roll. On the next forward stroke the blank is operated upon by the roll, which has in the meantime been brought down into its proper working position. In the arrangement shown in Figures 30 and 31 it will be necessary to change the roll at each stage in the rolling operations owing to the fact that a different ratio of diameter between the holding down tracks $l'$ and the diameter of the blade rolling surface is necessary in order to give progressive degrees of pinch to the blade. This does not necessarily constitute a great disadvantage to the process, as in commercial working large numbers of blanks will be passed through the machine and have one operation performed upon them before it is necessary to change the roll for one suitable for the succeeding operation; the blanks which have been operated upon will, in the meantime, be put through the annealing furnace. It is to be understood that the retaining means described with relation to Figures 30 and 31 will have to be of robust construction in order to resist the bursting forces which are set up during the rolling out of the metal.

Figures 28 and 29 show another modification in which the blade-forming bar is provided with a blade-forming groove in the form of a concave trough running the whole length of the bar, and a pocket space $g$ formed in an insert $q$. The rolls $l$ $l$ are mounted in a frame $k$ provided with two inserted strips of hardened steel $k'$ $k'$ which work in close contact with the surface $h'$ of the blade-forming bar and serve as retaining means for the blank and at the same time stanch against leakage of metal under the action of the rolls. In this modification, the frame $k$ carrying the rolls moves in the direction of the arrow when a blank is being rolled, and on its return stroke it is arranged to draw right out of the pinch frame $p$ so as to permit removal of the blank after it has been ejected by the ejection pins by suitable automatic means (not shown). Pressure required for the pinch may be applied by the pinch screws $m$, but in this case it is unnecessary to lift the rolls on the return stroke. The front end of the roll carrying frame $k$ is arranged with a tapered nose so as to permit it to readily enter the pinch frame $p$. In this modification, any suitable means such as eccentric bushes or the like must be provided for feeding the rolls down to obtain successive pinches, or alternatively the rolls may be exchanged for larger sets which will give the amount of pinch required.

In carrying the invention into effect according to another modification in which the blanks as shown at Figures 11, 12 and 13 are prepared by the second of the methods above described, we may use as the stock material a sheet of metal of suitable thickness. From this sheet suitably shaped pieces may be punched, for example, of L-form as illustrated as in Fig. 13 or of T-form as in Fig. 13ª. These punched pieces are then upset in a press with suitable dies 3 and 4 (Figures 14 and 15) so that the portion $c$ of the blank which is to form the blade has its plane displaced from the original plane.

It will be seen that the blank so upset (see Figures 14, 15, 16 and 17) will approximate to the form of a partially formed base $d$ and blade $c$. The upset blank is then placed in a pocket in a forming bar in a similar manner to that above described. The forming bar is of concave form with convex rolls. In this case a blade will be formed in which the base is on the convex side as shown at Figures 7 and 8.

It will be seen that blanks manufactured according to this method will require much less rolling, as the upset piece is much nearer the shape of the finished integral blade and base than is the case in the method of forming the blank shown in Figures 1 and 2. Furthermore, the blank of the form shown in Figs. 14 to 17 is less liable to the formation of a tail, because the bulk of the metal which is to form the blade is already disposed in a suitable position for this purpose, in relation to the blade portion, instead of the whole of it being placed vertically above the base portion, as in the case of the blank of Fig. 8ª.

In some cases there may be some difficulty in removing the blade from the forming bar, and to avoid this the blade portion of the blank may be suitably tapered, the widest portion being towards the end which forms the free end of the blade. The length of the tail of the T or L-shaped blank will be varied according to the length of blade which it is required to produce.

According to another method of carrying out the invention in which blanks of the third type shown at Figures 20 and 21 above described are used, the blade-forming bar (see Figures 22 and 23) consists of a plain parallel-sided bar 11 having its upper surface 12 of convex form and in which is machined a suitable pocket space 13 of substantially rectangular section at right angles to the length of the bar.

The bar may be conveniently mounted so as to work with a reciprocating motion and when the blank is placed in the pocket space the bar is forced along below rolls 14, only one of which is shown, which are provided with a flange 15 at each side and with concave working faces.

In order to prevent the blade from canting and in many cases from being picked out of the pocket by the roll, a suitable stripping or holding-down finger-piece 16 may be provided immediately behind the roll, this stripping or holding-down finger-piece being positioned only very slightly above the lowest point of the roll face and adapted to prevent the blade from rising out of the pocket space.

According to this modification the base portion $e$ is formed symmetrically relatively to the blade $f$ and after the blade has been rolled to its finished section (see Figure 26 which shows a perspective view of the blade after the final rolling operation), the whole piece is placed in another suitable die 17, Figure 24, and the base is then pressed to the desired form, as shown at Figure 25.

It may be necessary or desirable in some cases, depending on the amount of metal required in the blade base, to carry out the pressing of the base in two or more operations, in order that the amount of deformation of the material of the base at each operation may be kept small enough to avoid starting cracks or flaws in the material. Between the various stage operations of pressing the base the material may be reannealed.

Although we have illustrated only one general type of blade base, it will be understood that various other types may be used without departing from the spirit of the invention.

The operation of pressing the blade bases to the form required may be modified so that the bases are formed with a positive or negative taper in the direction of the length of the blade, thus producing blades the bases of which are of correct shape to pack closely together when the blades are projecting radially from the groove of the turbine shaft or cylinder respectively. Figure 32 shows a blade having a wedge-shaped base suitable for use in a turbine shaft and Figure 33 shows a blade having a wedge-shaped base suitable for use in a turbine cylinder.

According to another modification of the method of rolling just described, the former bar may be replaced by a disc of large diameter (see Figures 34 and 35); for example, a disc having a diameter of four feet or more and having a number of pockets situated in its periphery. Such a disc will enable blades to be produced in which the curvature along the length of the blade is relatively small and the curvature may ultimately be corrected by means of a simple operation. This disc, with the blanks disposed in the several pockets, may be rotated against a roll or series of rolls mounted in a frame containing both the rolls and the disc.

This method lends itself to the continuous production of blades, and it will be understood that the diameter of the disc will have to be varied according to the length of the blade which it is desired to produce in order that the final curvature may be within limits which will permit of satisfactory straightening.

Figure 34:
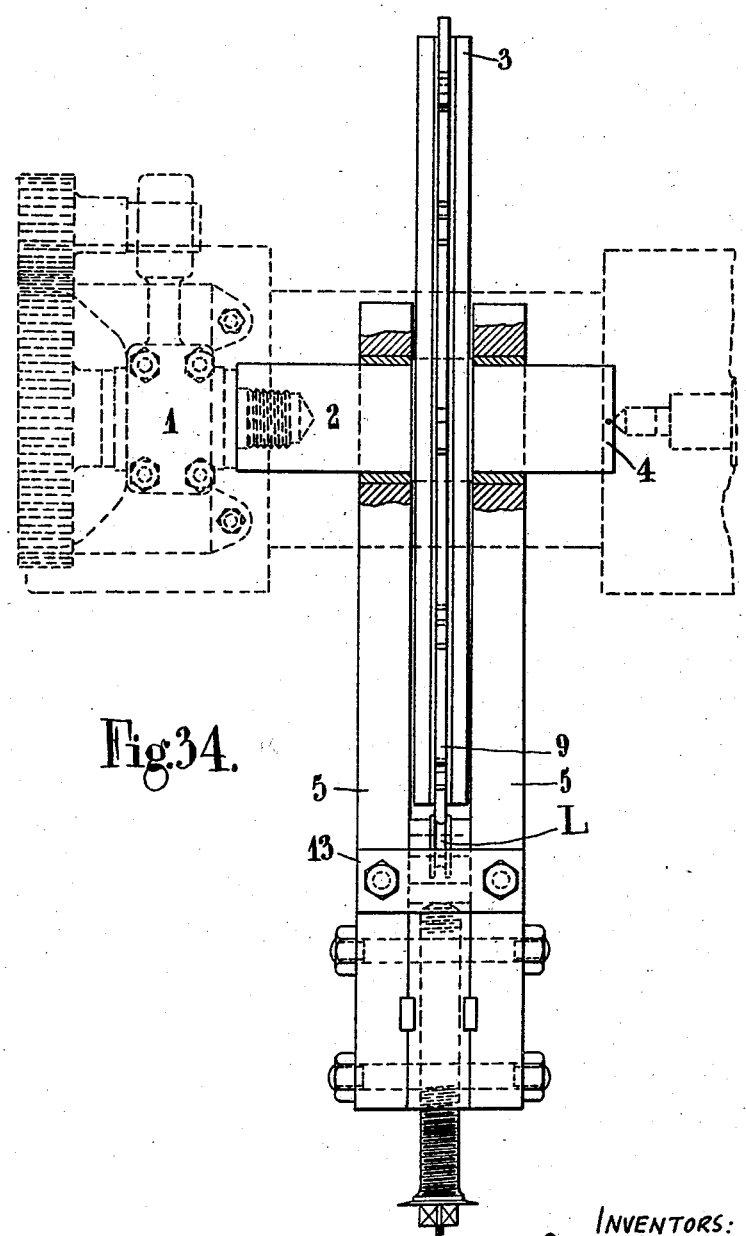
Figure 35:
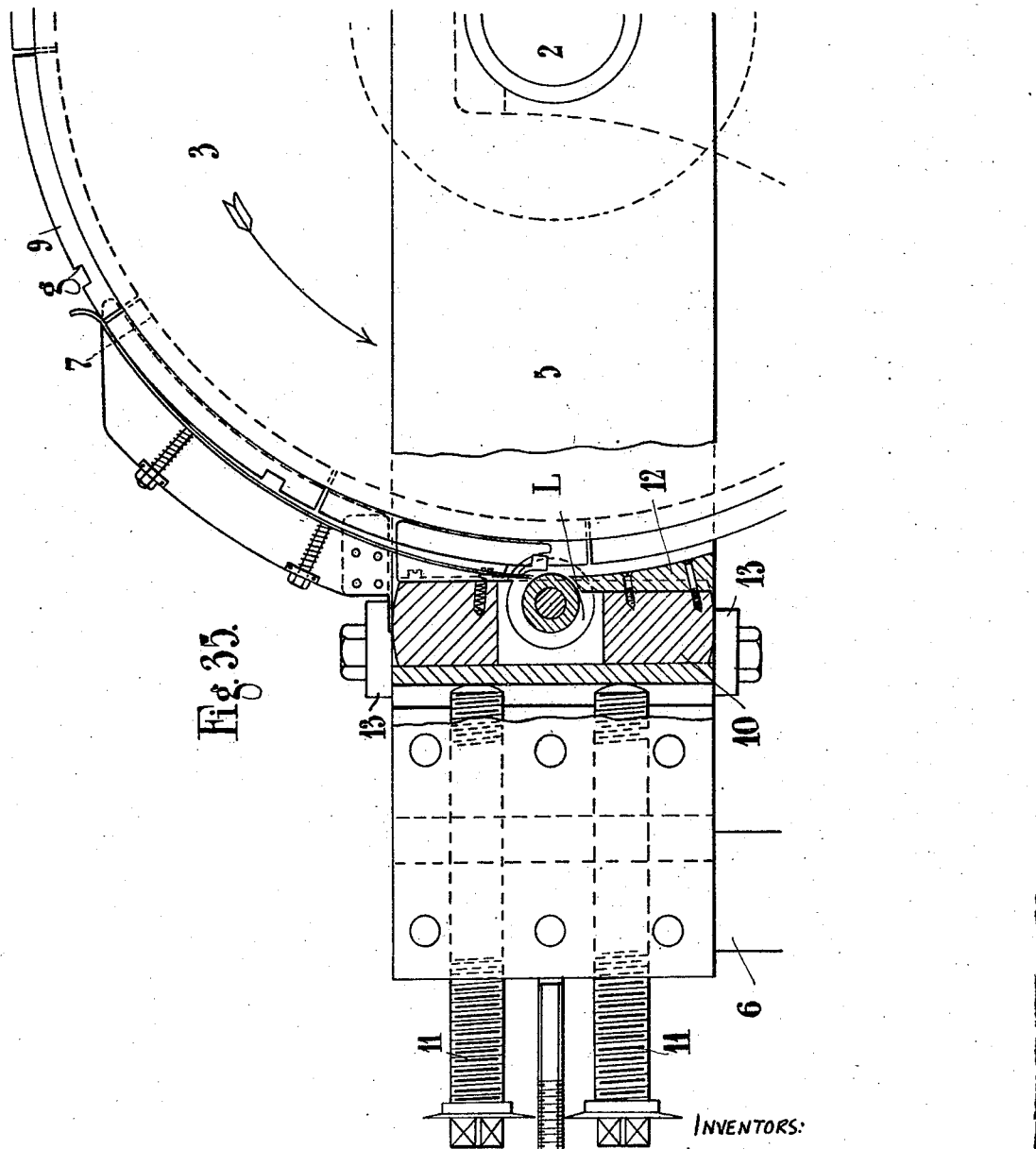

Referring to Figures 34 and 35, Figure 35 is an end elevation, and Figure 34 a plan view of a machine suitable for producing blades according to this modification. The machine comprises a source of power 1, driving a shaft 2, carrying a disc 3, the shaft 2 being steadied at 4 by a centre or other suitable means. The side members 5 which constitute the rolling mill frame are supported at one end by suitable bearings on the shaft 2 at the sides of the disc, and at the other end by a support column 6. The periphery of the disc is provided with a groove 7 into which a number of hardened insert segments 9 are fixed in any suitable manner. These insert segments though curved constitute the blade-forming bars performing functions similar to those described in connection with the machine illustrated in Figures 22 and 23, and each segment is made with a convex working surface and provided with a substantially rectangular pocket space $g$ cut in a direction parallel to the axis of the disc. As shown in Fig. 37, these segments may be held in place by screws indicated in dotted lines.

Figure 39 is a cross section of the disc and shows the grooves 7 with the blade-forming segment 9 fixed in position. The groove may be preferably made wide enough to accommodate the widest blade for which the machine is designed and various blades may be produced by using blade-forming segments stepped down to the desired width as shown in the figure. The roll 7 is provided with a concave working surface and with side flanges which closely embrace the projecting portion of the blade-forming segments. The roll is carried in a frame 10 which is capable of adjustment for pinch, and also for angular position by means of the two pinching screws 11. The roll frame carries a stripper finger piece 12 which prevents the blank from canting under the action of the roll, and also carries one end of a spring-mounted feeding trough which partly encircles the disc and serves to retain the blanks in position until they reach the roll. The blanks are fed into the pockets on the top of the wheel and the rolled blanks fall out by gravity as soon as they get free from the stripper finger 12. The roll-carrying frame is retained in position by the cover plates 13, 13. The use of two pinch screws enables the angle of the roll-carrying frame to be adjusted so that the stripper finger 12 (see Figure 36) may be brought close to or moved away from the blade-forming segments, thus avoiding the necessity for undue care in fitting it. In this machine the blades can be rolled through all the progressive stages without changing the roll, the only adjustment necessary between pinches being obtained with the pinch screws 11.

Owing to the kneading action of the roll there is a tendency for the base portion of the blade, which is lying in the pocket, to become lengthened and so cause it to jam in the pocket and require the application of considerable force for its removal. This is most undesirable in a continuous process machine and we therefore prefer between the rolling operations to shorten the length of the base portion of the blade to such a length that it will not be elongated sufficiently to jam but will be free enough to fall out by gravity as soon as it gets clear of the roll. This shortening of the base portion, between rolling operations, may be done in any convenient way, such as by milling, shaping, grinding, shearing, or jumping under a hammer.

It will be seen from the foregoing description that the above described processes for the manufacture of turbine blades lend themselves to the production of blades of tapered or reinforced section (see Figure 27). In order to form a blade thicker at the root than at the tip it is only necessary to remove some metal from the blade-forming bar or segment in proximity to the pocket and at a suitable angle for part or the whole of its length in order to obtain any desired taper or reinforcement.

It will also be seen that not only may the blade thickness be varied but the contour of one side of the blade may be varied from the base to the tip or part-way to the tip. In this manner we can produce blades suitable for high speeds of rotation which have only hitherto been obtained by costly forging and machining processes. Further it will be seen that by suitably designing the blade-forming bar and pocket space any desired radius can be obtained between the blade and its base.

It will be seen that by suitable variations the blade rolling or drawing process described may be applied to various forms of blank produced by various methods in order to form any type of blade integral with the base that may be required.

Further, it will be seen that many types of machine other than those above described may be employed. The various processes above described, however, have been found to give good results.

In addition, it will be seen that although the illustrations in this specification show only reaction blades the process is equally applicable to the manufacture of impulse blades which are usually manufactured by drop forging and by very costly machining processes.

Although in the foregoing descriptions only rolling processes have been dealt with, the invention covers also the use of die pieces in place of the rolls so that the process becomes a drawing process instead of a rolling process. For instance, it is only necessary to prevent the rolls from rotating and they will at once act as drawing dies.

This application is a division of application Serial Number 475,789, filed June 7, 1921.

Having now described our invention what we claim as new and desire to secure by Letters Patent is:—

1. Machine for manufacturing turbine blades integral with their bases from blanks, comprising in combination a former-bed having a recess therein to receive part of said blank forming the base, and having a die formation, and means for performing a succession of progressive operations upon one face only of another part of the blank longitudinally of said die formation to flow the metal of said blank along the die formation, and thereby to form the blade and give it the desired cross section.

2. Machine for manufacturing turbine blades integral with their bases from blanks, comprising in combination a former-bed having a recess therein to receive part of said blank forming the base, and having a die formation, and means for performing a succession of progressive operations by rolling upon one face only of another part of the blank longitudinally of aid die formation, to flow the metal of said blank along the die formation and thereby to form the blade and give it the desired cross section.

3. Machine for making turbine blades integral with the bases from blanks, comprising in combination a former-bed having a base holding portion with a surface the counterpart of a surface of the blank, and a die formation, means for performing a succession of progressive operations upon one face only of said blank, longitudinally of said die formation to flow the metal of said blank along said die formation and thereby to form the blade proper of the desired cross section, and means for producing relative motion between the base holding portion and the progressively acting means, substantially as described.

4. Machine for manufacturing turbine blades integral with their bases from blanks, comprising in combination a rotatably mounted wheel or disc having recesses around the periphery thereof for holding the base forming portions of a plurality of separate blanks, and means for extending another portion of said blanks to form the blades proper, as set forth.

5. Machine for manufacturing turbine blades integral with their bases from blanks, comprising in combination a former-bed having a recess therein to receive part of said blank forming the base, and having a die formation, and means for performing a succession of progressive operations upon one face only of another part of the blank longitudinally of said die formation to flow the metal of said blank along the die formation and thereby to form the blade and give it the desired cross section, said means also exerting pressure on the said base forming part of the blank located within said recess.

6. Machine for manufacturing turbine blades integral with their bases from blanks, comprising in combination a former-bed having a recess therein to receive part of said blank forming the base, and having a die formation, and means for performing a succession of progressive operations upon one face only of another part of the blank longitudinally of said die formation, to flow the metal of said blank along the die formation and thereby to form the blade and give it the desired cross section, said progressive operating means consisting of a double flanged roll, substantially as described.

7. Machine for manufacturing turbine blades integral with their bases from blanks, comprising in combination a former-bed having a recess therein to receive part of said blank forming the base, and having a die formation, and means for performing a succession of progressive operations upon one face only of another part of the blank longitudinally of said die formation, to flow the metal of said blank along the die formation and thereby to form the blade and give it the desired cross section, and means to produce relative motion between said former-bed and the progressive operating means along a line inclined to the working surface of said former-bed, substantially as described.

8. Machine for making turbine blades integral with the bases from blanks, comprising in combination a former-bed having a base holding portion with a surface the counterpart of a surface of the blank, and a die formation, means for performing a succession of progressive operations upon one face only of said blank, longitudinally of said die formation to flow the metal of said blank along said die formation and thereby to form the blade proper of the desired cross section, and means for producing relative motion between the base holding portion and the progressively acting means, and means for preventing canting of the blank during formation of the blade, substantially as described.

9. Machine for making turbine blades integral with the bases from blanks, comprising in combination a former-bed having a base holding portion with a surface the counterpart of a surface of the blank, and a die formation, means for performing a succession of progressive operations upon one face only of said blank, longitudinally of said die formation to flow the metal of said blank along said die formation and thereby to form the blade proper of the desired cross section, and means for producing relative motion between the base holding portion and the progressively acting means, and means for preventing the formation of a tail, substantially as described.

In testimony whereof we have signed our names to this specification.

CHARLES ALGERNON PARSONS.
ALFRED QUINTIN CARNEGIE.
MATTHEW BONE.